(12) United States Patent
Kamay (10) Patent No.: US 9,507,618 B2
(45) Date of Patent: Nov. 29, 2016

(54) VIRTUAL MACHINE SYSTEM SUPPORTING A LARGE NUMBER OF DISPLAYS

(75) Inventor: Yaniv Kamay, Modi' (IL)

(73) Assignee: Red Hat Israel, Ltd., Raanana (IL)

( * ) Notice: Subject to any disclaimer, the term of this patent is extended or adjusted under 35 U.S.C. 154(b) by 738 days.

(21) Appl. No.: 12/475,539

(22) Filed: May 31, 2009

(65) Prior Publication Data

US 2010/0306306 A1 Dec. 2, 2010

(51) Int. Cl.
*G06F 15/16* (2006.01)
*G06F 9/455* (2006.01)
*G06F 9/44* (2006.01)

(52) U.S. Cl.
CPC ......... *G06F 9/45558* (2013.01); *G06F 9/4443* (2013.01); *G06F 2009/45579* (2013.01)

(58) Field of Classification Search
CPC ............. G06F 9/45558; G06F 9/4443; G06F 2009/45579
USPC ....................................................... 709/203
See application file for complete search history.

(56) References Cited

U.S. PATENT DOCUMENTS

| | | | |
|---|---|---|---|
| 8,788,822 B1 * | 7/2014 | Riddle | H04L 47/6275 713/169 |
| 2007/0124474 A1 * | 5/2007 | Margulis | 709/226 |
| 2009/0102838 A1 * | 4/2009 | Bullard et al. | 345/419 |
| 2010/0162235 A1 * | 6/2010 | Ginzton et al. | 718/1 |
| 2010/0299436 A1 * | 11/2010 | Khalid et al. | 709/226 |

OTHER PUBLICATIONS

Qumranet, Solid ICE™, Connection Broker, Apr. 2008, 7 pages.
Qumranet, KVM-Kernel-based Virtualization Machine, White Paper, 2006, 5 pages.
Qumranet, Solid ICE™, Overview, Apr. 2008, 15 pages.
Qumranet, Solid ICE™, Provisioning Manager, Apr. 2008, 5 pages.
Qumranet, Solid ICE™, Virtual Desktop Server (VDS), Apr. 2008, 6 pages.

* cited by examiner

*Primary Examiner* — Joseph Greene
(74) *Attorney, Agent, or Firm* — Lowenstein Sandler LLP (57) ABSTRACT

A method and system for supporting multiple displays in a virtual machine (VM) environment are disclosed. The system includes a client device coupled to a server hosting one or more VMs. The client device may include multiple displays and a client display manager coupled to the displays. The client display manager may be operable to establish display connections with virtual devices of a VM, receive data generated by the VM via the display connections, and forward the data to a display controller of a relevant display.

24 Claims, 8 Drawing Sheets

VIRTUAL MACHINE SYSTEM SUPPORTING A LARGE NUMBER OF DISPLAYS

TECHNICAL FIELD

The embodiments of the invention relate generally to virtual machine systems and, more specifically, relate to a virtual machine system supporting a large number of displays.

BACKGROUND

In computer science, a virtual machine (VM) is a portion of software that, when executed on appropriate hardware, creates an environment allowing the virtualization of an actual physical computer system. Each VM may function as a self-contained platform, running its own operating system (guest OS) and software applications (processes). Typically, a virtual machine manager (VMM) manages allocation and virtualization of computer resources and performs context switching, as may be necessary, to cycle between various VMs.

A host machine (e.g., computer or server) is typically enabled to simultaneously run multiple VMs, where each VM may be used by a remote client. The host machine allocates a certain amount of the host's resources to each of the VMs. Each VM is then able to use the allocated resources to execute applications, including guest operating systems. The VMM virtualizes the underlying hardware of the host machine or emulates hardware devices, making the use of the VM transparent to the guest operating system or the remote client that uses the VM.

A VM may include one or more applications that generate data (e.g., images, video, etc.) to be displayed at a physical display device of the host machine. Usually, a display connection is established with the VM to receive this data and to send user input provided at the display device back to the VM. If the host machine has multiple display devices that render data generated by the VM, the display connection with the VM becomes heavily burdened, negatively impacting the end user experience.

Further, a VM may run in a remote server environment, in which a centralized server is partitioned into multiple VMs that may, for example, host virtual desktops, thereby providing a desktop for an end user of a remote client device. A remote client may have multiple displays to render data generated by the VM. However, currently there is no mechanism that can effectively display the output of a VM on multiple screens or display terminals of a remote client.

BRIEF DESCRIPTION OF THE DRAWINGS

The invention will be understood more fully from the detailed description given below and from the accompanying drawings of various embodiments of the invention. The drawings, however, should not be taken to limit the invention to the specific embodiments, but are for explanation and understanding only.

DETAILED DESCRIPTION

A method and system for supporting multiple displays in a virtual machine (VM) environment are disclosed. In one embodiment, a client is coupled to a server hosting one or more VMs. The client has a large number of displays that can render data generated by the VM. Each VM has multiple virtual devices associated with the displays of the client. In one embodiment, the client establishes display connections with virtual devices of the VM using at least one communication channel for each virtual device of the VM. Upon receiving data generated by the VM via a display connection, the client determines which display should present the data generated by the VM, and forwards the data to a display controller of the determined display. In one embodiment, separate channels are provided to communicate different types of data between the virtual device and the client (e.g., video data, cursor data, three-dimensional data, etc.).

By associating virtual devices of the VM with individual displays of the client and by using multiple channels to connect the virtual devices of the VM to the client, data generated by the VM is efficiently provided to multiple monitors of the client, and the overall end user experience is significantly improved. The above mechanism may also be applicable to a local host environment, in which the host includes a large number of displays that can render data generated by a VM running on the host.

In the following description, numerous details are set forth to provide a more thorough explanation of the embodiments of the present invention. It will be apparent, however, to one skilled in the art, that the present invention may be practiced without these specific details. In some instances, well-known structures and devices are shown in block diagram form, rather than in detail, in order to avoid obscuring the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "deleting", "configuring", "enabling", "disabling", "determining" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

Figure 1:
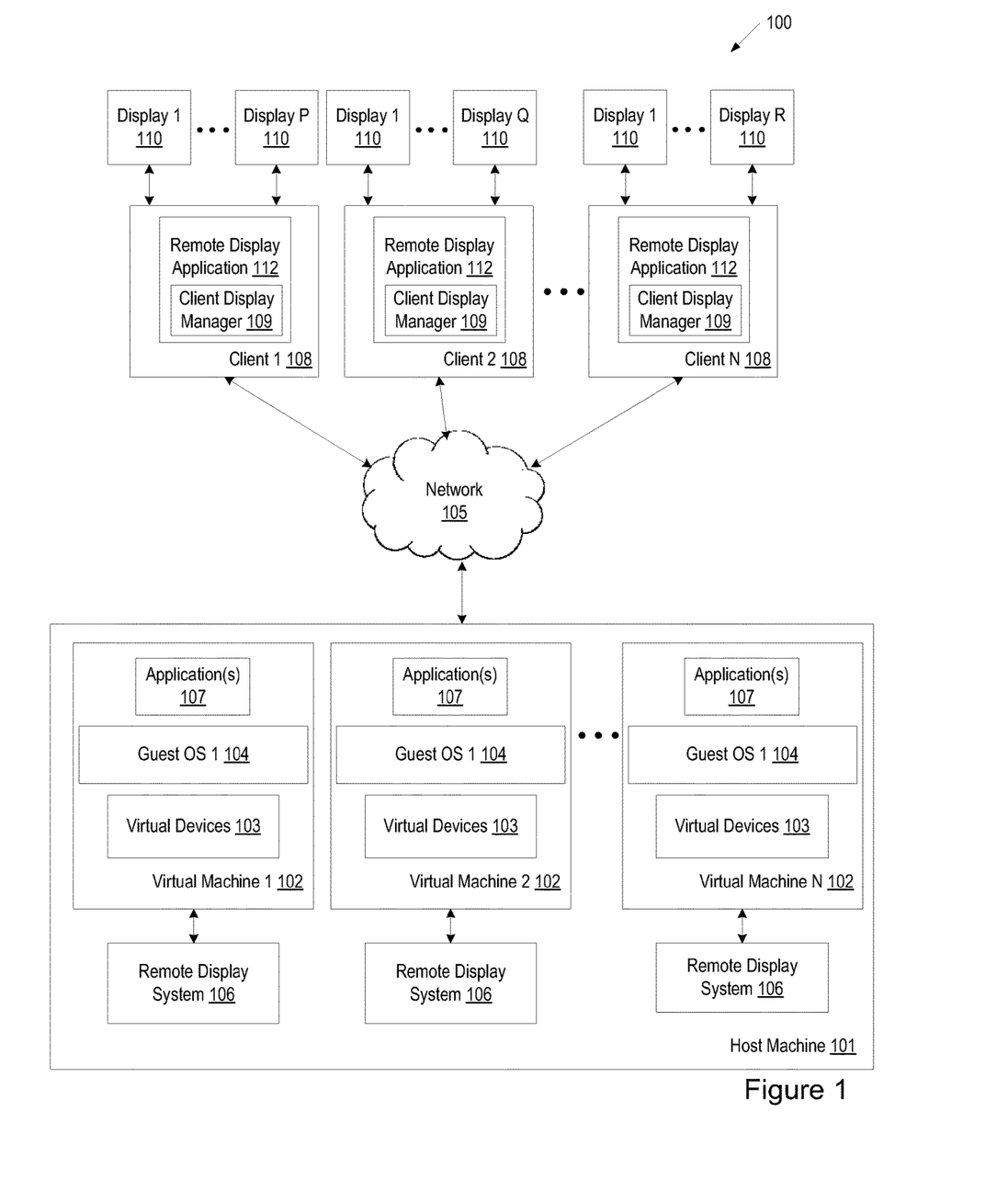
FIG. 1 is a block diagram of a virtual machine system for supporting multiple displays in a remote host environment according to one embodiment of the invention.

FIG. 1 is a block diagram of a virtual machine system 100 for supporting multiple displays in a remote host environment according to one embodiment of the invention. System 100 includes one or more clients 108 communicatively coupled to a host machine or a cluster of host machines 101 over a network 105. Network 105 may be a local area network (LAN) or a wide area network (WAN) and may be a combination of one or more networks. Client 108 may be any computer system in communication with host machine 101 for remote execution of applications at host machine 101.

The host machine 101 is configured to host one or more VMs 102, each having a guest operating system 104. Multiple guest operating systems and the associated VMs may be controlled by another operating system, known as a host OS or a virtual machine monitor (VMM) for managing the hosted VMs. The VMM may also be referred to as a hypervisor or a kernel-based virtual machine (KVM).

A guest OS 104 may be of the same or different type with respect to the host OS. For example, a guest OS may be a Windows™ operating system from Microsoft and a host OS may be a Linux operating system available from Red Hat. In addition, the guest OSes 104 can be of the same or different types.

VM 102 can be any type of virtual machines, such as, for example, hardware emulation, full virtualization, para-virtualization, and operating system-level virtualization virtual machines. Different VMs 102 hosted by server 101 may have the same or different privilege levels for accessing different resources.

The host 101 may be coupled to a host controller (not shown) via a network or directly. The host controller can manage the VMs 102 by, for example, adding a VM, deleting a VM, balancing the load on the server cluster, providing directory service to the VMs 102, and perform other management functions.

Each VM 102 may include one or more applications 107 hosted by corresponding guest OSes 104. Each VM 102 can communicate to one or more clients 108. In one embodiment, each virtual machine 102 hosts or maintains a desktop environment providing virtual desktops for remote clients 108. In some embodiments, client 108 may be a thin client with sufficient resources to enable a user to interact with a virtual desktop provided by VM 102. A virtual desktop can represent an output (e.g., an image to be displayed) generated by a desktop application 107 running within VM 102. Graphics data associated with the virtual desktop can be captured and transmitted to client 108 (e.g., in the form of commands), where the virtual desktop may be rendered and presented by a remote display application 112. The remote display application 108 may be a thin client application such as a browser application. In one embodiment, the host 101 communicates with remote display application 112 using a remote access protocol (e.g., Remote Desktop Protocol (RDP), Simple Protocol for Independent Computing Environments (SPICE™ from Red Hat, etc.) that allows for display connection between the host 101 and the client.

Each client 108 is communicatively coupled to multiple displays 110 that present data rendered by the remote display application 112. Each display 110 can be a display monitor, a window on a monitor screen, or any other entity that can receive graphic input and/or graphic commands. Each display 110 is associated with a display controller (not shown) that controls presentation of data on a relevant display 110. In response to client side data, an application (e.g., application 107) can generate output display commands (e.g., graphics commands), which may include one or more paint and/or draw operations, for example, in the form of executable instructions. The output display commands can then be transmitted (e.g., as graphics update commands) to the client 108, and the remote display application 112 can collect the graphics commands and generate corresponding drawing commands for rendering data on the client display devices 110.

Each VM 102 may have multiple virtual devices 103 that emulate physical devices such as display cards (e.g., PCI display cards). For example, a virtual device 103 may emulate graphic verbs such as drawing lines, ellipses, fill areas, display images, etc. In addition, the virtual devices 104 may emulate 3D verbs, such as drawing cubes, rotating a shape, etc. and may also provide video streaming verbs. In some embodiments, the virtual devices 103 use the local host hardware to accelerate some functions (e.g., local rendering).

As will be discussed in more detail below, each virtual device 103 can be connected with the client using a separate network connection or a shared network connection. In one embodiment, a virtual device 103 can be connected to multiple clients 108 and can transmit the output to the multiple clients 108 simultaneously, although not necessarily equally.

In one embodiment, the remote display application 112 of client 108 includes a client display manager 109 that forwards data to, and receives response from, display controllers of the client displays 110. The client display manager 109 is responsible for establishing connections with virtual devices 103 that provide data to be rendered at the display devices 110. In one embodiment, the client display manager 109 establishes a connection with a virtual device 103 using the IP address and port of the virtual device 103. In one embodiment, each connection between the virtual device 103 and the client display manager 109 is provided via at least one dedicated channel (e.g., a socket). Alternatively, the virtual device 103 may share the network connection with other virtual devices 103. Such a connection can be enabled using, for example, virtual channels (e.g., by adding a channel ID to transferred data).

In one embodiment, the host 101 includes a remote display system (RDS) 106 for each VM 102. The RDS 106 may be part of the VMM or a hardware emulation layer, or run on top of the VMM. The RDS 106 oversees network connections of the VM 102 and assists the client display manager 109 in establishing display connections for the virtual devices 103 of the VM 102. In particular, in one embodiment, the client display manager 109 establishes an initial connection with the host 101 and requests information about the available display channels that the client display manager 109 can connect to. The client display manager 109 then uses this information to establish display connections with the virtual devices 103 of the VM 102. During the active display connection, the RDS 106 receives data (e.g., graphics commands) from the virtual devices 103 of the VM 102, and communicates this data to the client display manager 109. In one embodiment, the RDS 106 uses a shared connection to send graphics commands of multiple virtual devices 103. Alternatively, the RDS 106 uses separate connections for different virtual devices 103. In addition, in some embodiments, the RDS 106 uses different connections for different types of data (different types of graphics commands such as video, mouse, 3D data, etc.), where each type of data can be transmitted using a dedicated connection or a shared connection. In some embodiments, the RDS 106 also performs additional processing (e.g., compression, encryption, streaming, etc.) of the data received from the virtual devices 103 prior to communicating it to the client display manager 109.

The client display manager 109 receives data (e.g., graphics commands) of the virtual devices 103, and determines which display 110 should present this data. In one embodiment, in which the data is received via a dedicated channel (e.g., a socket), the client display manager 109 makes this determination based on the context of the dedicated channel (e.g., using the mapping between the socket ID and the display ID). In another embodiment, in which the data is received via a shared connection (e.g., using a virtual channel with a channel ID), the client display manager 109 makes this determination based on the identifier of the display device that is included in the received data (e.g., in the header of the graphics command issued by the virtual device 103).

Figure 2:
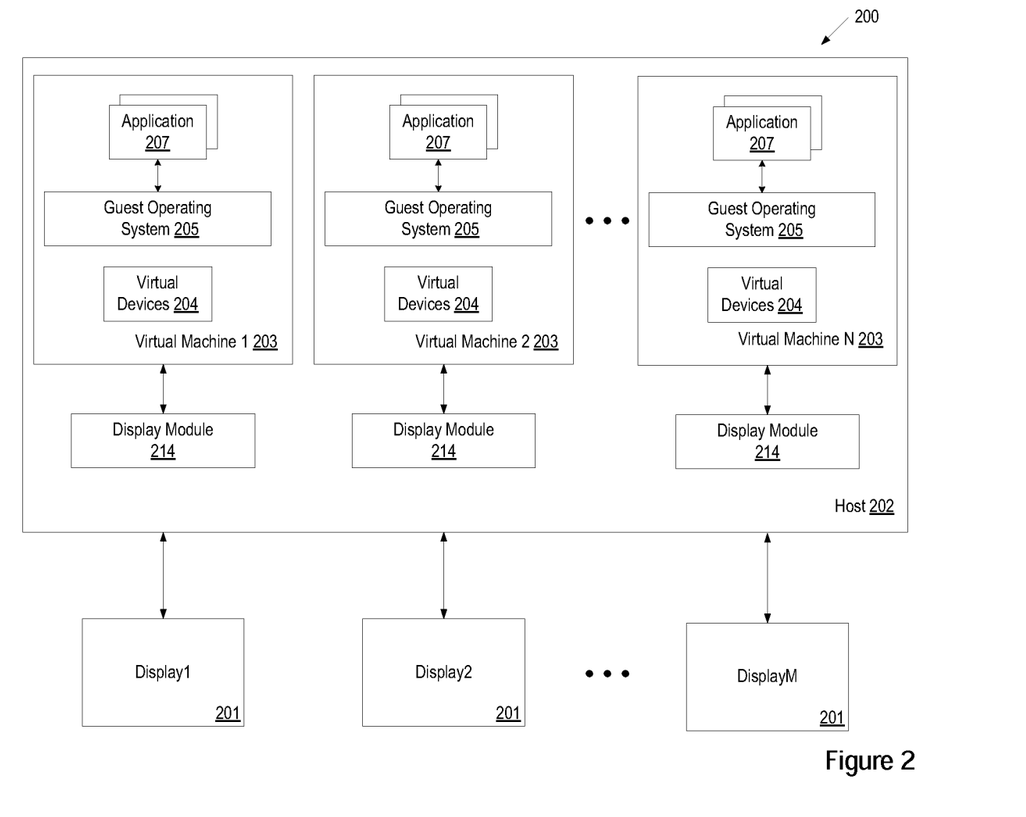
FIG. 2 is a block diagram of a virtual machine system for supporting multiple displays in a local host environment according to one embodiment of the invention.

FIG. 2 is a block diagram of a virtual machine system 200 for supporting multiple displays in a local host environment according to one embodiment of the invention. System 200 includes multiple displays 201 communicatively coupled to a host computer 202. The displays 201 may include display monitors, windows on a monitor screen, or any other entity that can receive graphic input and/or graphic commands. Each display 201 is associated with a display controller (not shown) that controls presentation of data on a relevant display 201.

Computer 202 hosts one or more VMs 203, each having one or more applications 207 hosted by a guest OS 205. The guest operating systems and the associated VMs are controlled by a host OS or a VMM. Each VM 203 has multiple virtual devices 204 that emulate physical devices such as display cards, similarly to virtual devices 103 of FIG. 1.

In one embodiment, the host 202 includes display modules 214 associated with individual VMs 203. The display modules 214 may be part of the VMM or a hardware emulation layer, plugins for the VMM or the hardware emulation layer, or independent modules running on top of the VMM. In another embodiment, one display module 214 is provided to operate with all VMs 203 of the host 202.

The display module 214 establishes a display connection with each virtual device 204. of the VM 203 In one embodiment, each display connection is dedicated to a specific virtual device 204. Alternatively, a display connection can be shared by multiple the virtual devices 204. Such a connection can be established using, for example, virtual channels (e.g., by adding a channel ID to the transferred data).

During the active display connection with the VM 203, the display module 214 receives data (e.g., graphics commands) from the virtual devices 204, and determines which display device 201 should present this data. In one embodiment, in which the data is received via a dedicated channel, the display module 214 makes this determination based on the context of the dedicated channel. In another embodiment, in which the data is received via a shared connection (e.g., using a virtual channel with a channel ID), the display module 214 makes this determination based on the identifier of the display device that is included in the received data.

Figure 3:
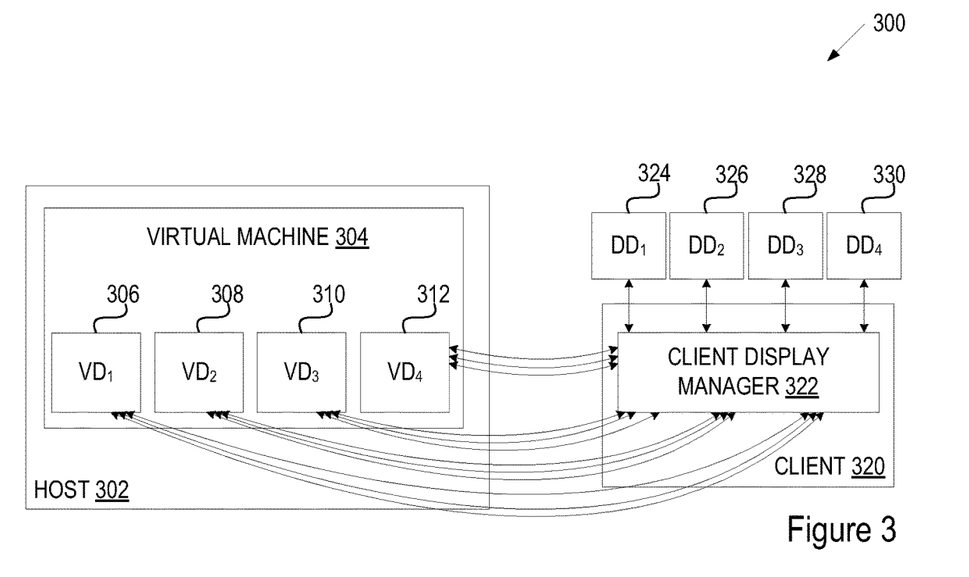
FIG. 3 is a block diagram illustrating display connections of a virtual machine in a remote host environment according to an embodiment of the invention.

FIG. 3 is a block diagram illustrating exemplary display connections of a VM in a remote host system 300 according to an embodiment of the invention. System 300 includes a host 302 and a remote client 320 coupled to the host 302 via a network. The host 302 includes one or more VMs 304. The client 320 has multiple displays 324 through 330 connected to the client display manager 322. Displays 324 through 330 may include display monitors, windows on a monitor screen, and the like.

Each virtual device has at least one communication channel with the client display manager 322. In the shown embodiment, each virtual device has multiple channels for communicating data of different types such as video data, mouse data, 3D data, etc. This separation of data into different data streams may enable different QoS levels and features for each stream. For example, the mouse data may be prioritized to make the machine more interactive, the keyboard data may be encrypted, the video data may be compressed, and the 3D data may be transmitted unchanged. Alternatively, more or less channels can be used for each virtual device.

A channel can be implemented using a dedicated connection (e.g., a socket) or a shared connection (e.g., a virtual channel with an additional channel ID field). In one embodiment, a virtual device can have channel connections with multiple clients 320, and can transmit output to all the clients simultaneously, although not necessarily equally.

During the active display connection with the VM 304, the client display manager 322 receives data (e.g., graphics commands) generated by the virtual devices, and determines which display should present this data. In one embodiment, in which the data is received via a dedicated channel (e.g., a socket), the client display manager 322 makes this determination based on the context of the dedicated channel (e.g., using the mapping between the socket ID and the display ID). In another embodiment, in which the data is received via a shared connection, the client display manager 322 makes this determination based on the identifier of the display device that is included in the received data (e.g., in the header of the graphics command sent by the virtual device).

The system 300 may operate in a wide area network (WAN) environment, as well as a local area network (LAN) environment. On LANs, where greater bandwidth is available, as compared to WANs, the host CPU resources are used relatively sparingly, while the bandwidth resources are used more freely. As such, data generated by each virtual device may not require processing by the guest OS, and can instead be transmitted directly to the matching display to handle the presentation of the content. In this way, relatively heavy or resource intensive content may be rapidly and effectively handled by multiple displays.

Figure 4:
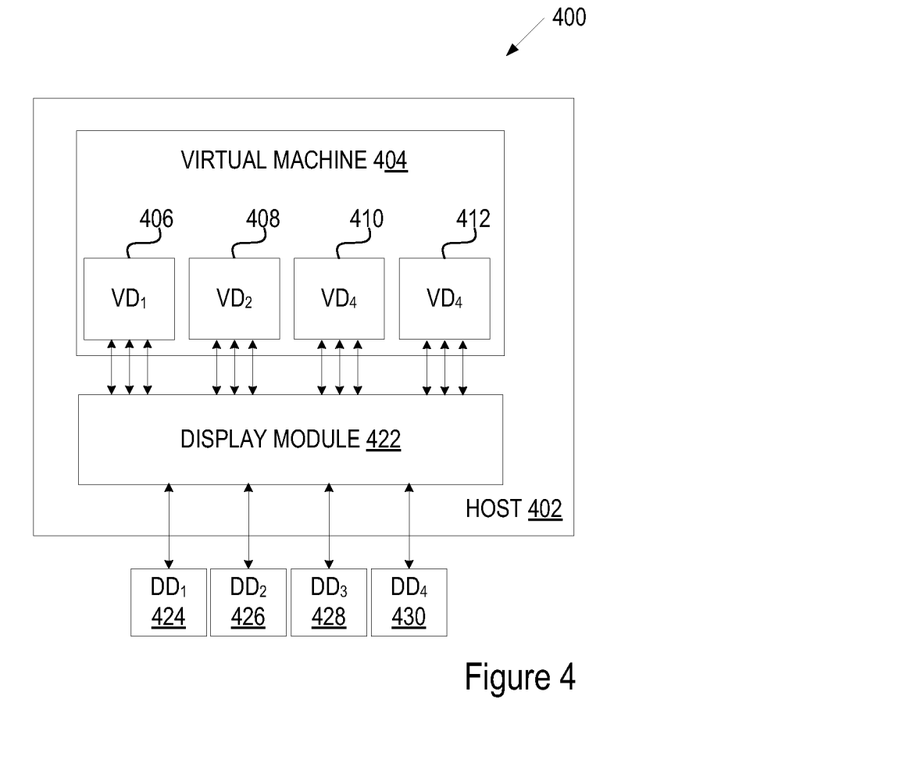
FIG. 4 is a block diagram illustrating display connections of a virtual machine in a local host environment according to an embodiment of the invention.

FIG. 4 is a block diagram illustrating display connections of a virtual machine in a local host system 400 according to an embodiment of the invention. System 400 includes a host 402 running one or more VMs 404. The host 402 has multiple displays 424 through 430 connected to a display module 422. Displays 424 through 430 may include display monitors, windows on the screen of a display monitor, and the like.

Each virtual device has at least one communication channel with the display module 422 that provides functionality similar to that of client display manager 322 of FIG. 3, except that it operates locally (e.g., using an API) when establishing display connections of the VM and handling data communicated during active display connections, instead of performing networking operations. In the shown embodiment, each virtual device has multiple channels for communicating data of different types such as video data, mouse data, 3D data, etc. Alternatively, a single channel can be used for each virtual device.

During the active display connection with the VM 404, the display module 422 receives data (e.g., graphics commands) from the virtual devices, and determines which display should present this data. In one embodiment, in which the data is received via a dedicated channel, the display module 422 makes this determination based on the context of the dedicated channel. In another embodiment, in which the data is received via a shared connection, the display module 422 makes this determination based on the identifier of the display device that is included in the received data.

Figure 5A:
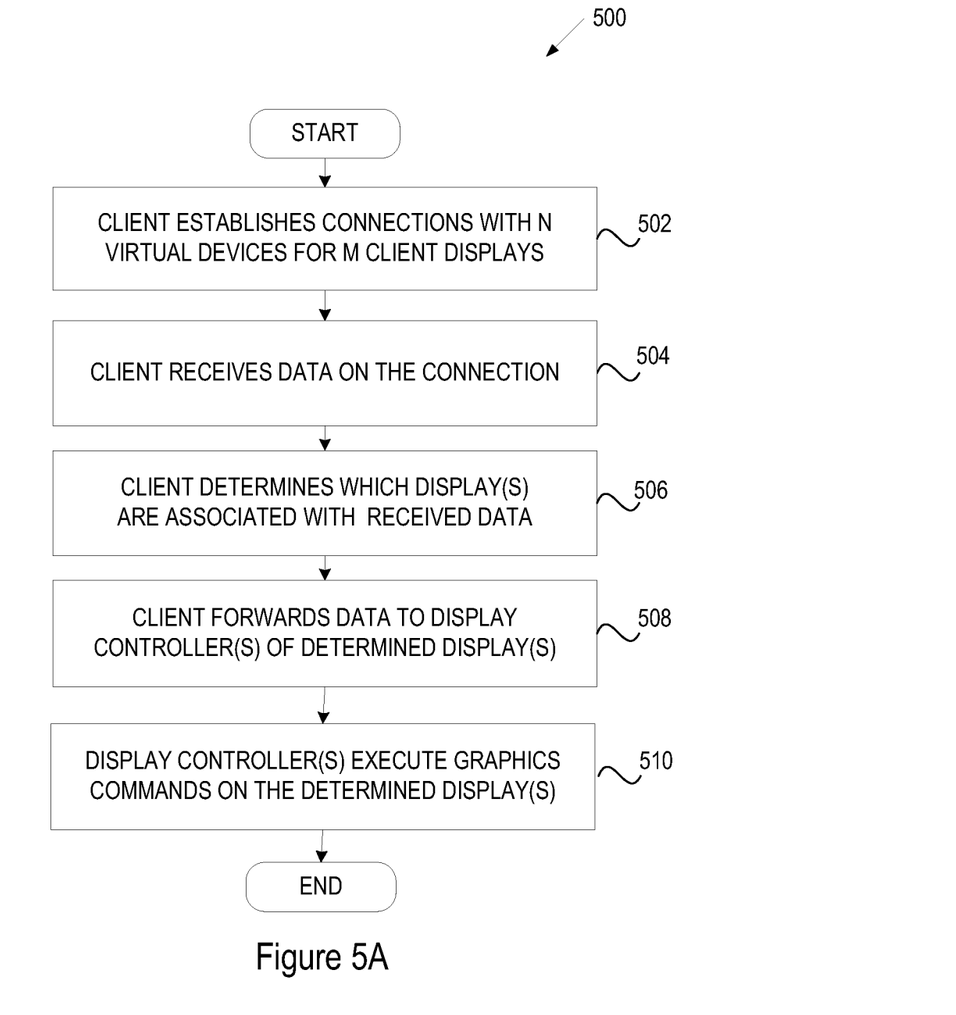
FIG. 5A is a flow diagram illustrating a client-side method for supporting multiple displays in a remote host environment, in accordance with one embodiment of the invention.

FIG. 5A is a flow diagram illustrating a client-side method 500 for supporting multiple displays in a remote host environment, in accordance with one embodiment of the invention. Note that method 500 may be performed by processing logic which may include software, hardware, or a combination of both. For example, method 500 may be performed by system 100 of FIG. 1.

Method 500 begins at block 502 where a client establishes display connections for multiple virtual devices of the VM. The client may establish at least one dedicated channel connection for a virtual device of the VM (e.g., via a socket). Alternatively, the client may establish a shared connection for multiple virtual devices (e.g., using virtual channels). In one embodiment, each display connection can be split into separate channels to communicate different types of data. In one embodiment, prior to establishing display connections, the client establishes an initial connection and uses it to obtain information about the channels that the client can connect to, including the available display channels associated with the virtual devices of the VM. The client then uses this information to establish display connections with the VM.

At block 504, the client receives data (e.g., a graphics command) generated by the VM on the connection. At block 506, the client determines which display(s) should present the data from this connection. As discussed above, this determination can be made based on the context of the connection or using a display ID that may be received as part of the command header. At block 508, the client forwards the received command to a display controller of the appropriate display(s). At block 510, the display controller executes the command on the display.

Figure 5B:
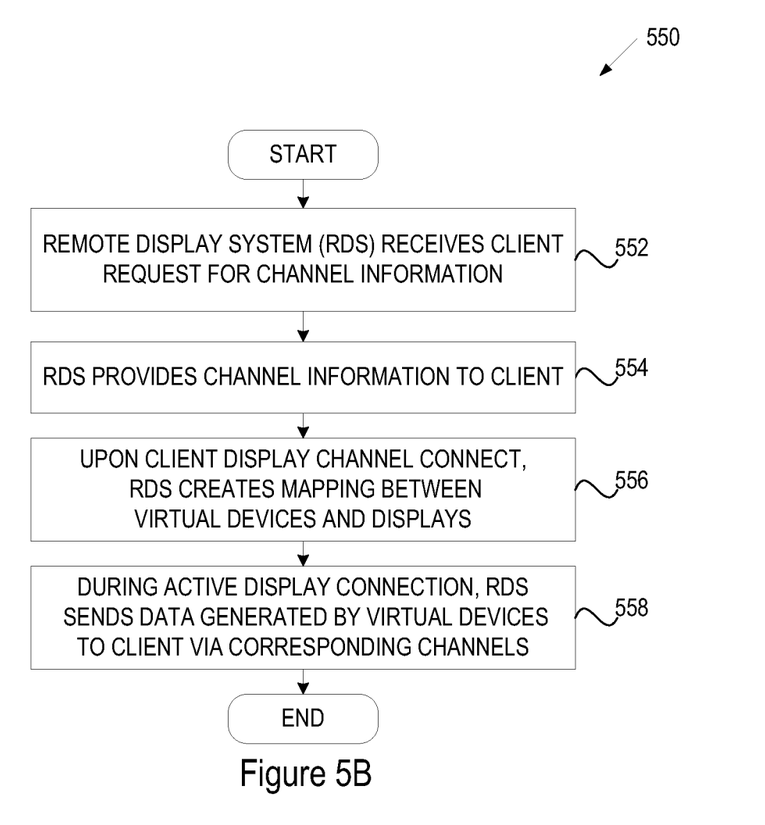
FIG. 5B is a flow diagram illustrating a server-side method for supporting multiple displays in a local host environment, in accordance with one embodiment of the invention.

FIG. 5B is a flow diagram illustrating a server-side method 550 for supporting multiple displays in a remote host environment, in accordance with one embodiment of the invention. Note that method 550 may be performed by processing logic which may include software, hardware, or a combination of both. For example, method 550 may be performed by system 100 of FIG. 1.

Method 550 begins at block 552 where RDS receives a client request for information about available channels. In one embodiment, the RDS receives the client request via an initial (main) channel connection established by the client with the host. In addition to the main channel, various other types of channels can be available for the client to connect to. Some exemplary channel connections may include a display connection, a cursor connection, and inputs connection, a record connection, a playback connection, etc.

At block 554, RDS sends information about available channels to the client, including information about display channels associated with multiple virtual devices of the VM. Each display channel may have a unique channel ID. In some embodiments, RDS subsequently sends notifications about added or removed channels to the client in real time.

At block 556, RDS receives the client's request to establish display connections with the virtual devices of the VM for the client displays, and creates mapping between the virtual devices and the client displays based on the client request that identifies the displays.

Subsequently, during the active display connection, RDS sends data generated by the virtual devices to the client via the corresponding channel connection(s). In one embodiment, the RDS uses a shared connection to send graphics commands of multiple virtual devices. Alternatively, the RDS uses separate connections for different virtual devices. In addition, in some embodiments, the RDS uses different connections for different types of data (different types of graphics commands such as video, mouse, 3D data, etc.), where each type of data can be transmitted using a dedicated connection or a shared connection.

When receiving data back from the client, the RDS determines an appropriate virtual device based on the mapping between the virtual devices and the client displays, forward the data to the appropriate virtual device.

Figure 6:
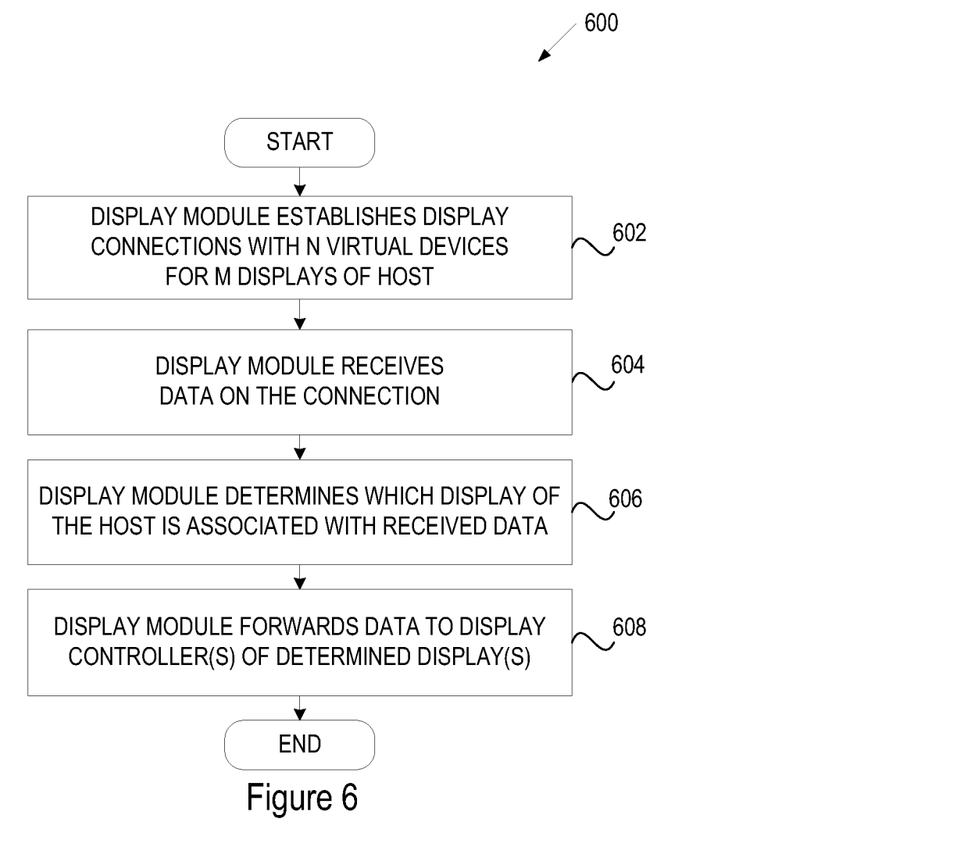
FIG. 6 is a flow diagram illustrating a method for supporting multiple displays in a local host environment, in accordance with one embodiment of the invention.

FIG. 6 is a flow diagram illustrating a method 600 for supporting multiple displays in a local host environment, in accordance with one embodiment of the invention. Note that method 600 may be performed by processing logic which may include software, hardware, or a combination of both. For example, method 600 may be performed by system 200 of FIG. 2.

Method 600 begins at block 602 where a display module of the host establishes display connections with multiple virtual devices of the VM. The display module may establish at least one dedicated channel connection for a virtual device of the VM. Alternatively, the display module may establish a shared connection for multiple virtual devices of the VM (e.g., using virtual channels). In one embodiment, each display connection can be split into separate channels to communicate different types of data.

At block 604, the display module receives data (e.g., a graphics command) generated by the VM on the connection. At block 606, the display module determines which display(s) should present data from this connection. As discussed above, this determination can be made based on the context of the connection or using a display ID that may be part of the received data. At block 608, the display module forwards the received command to the display controller(s) of the appropriate display(s). The display controller(s) then execute the command on the display(s).

Figure 7:
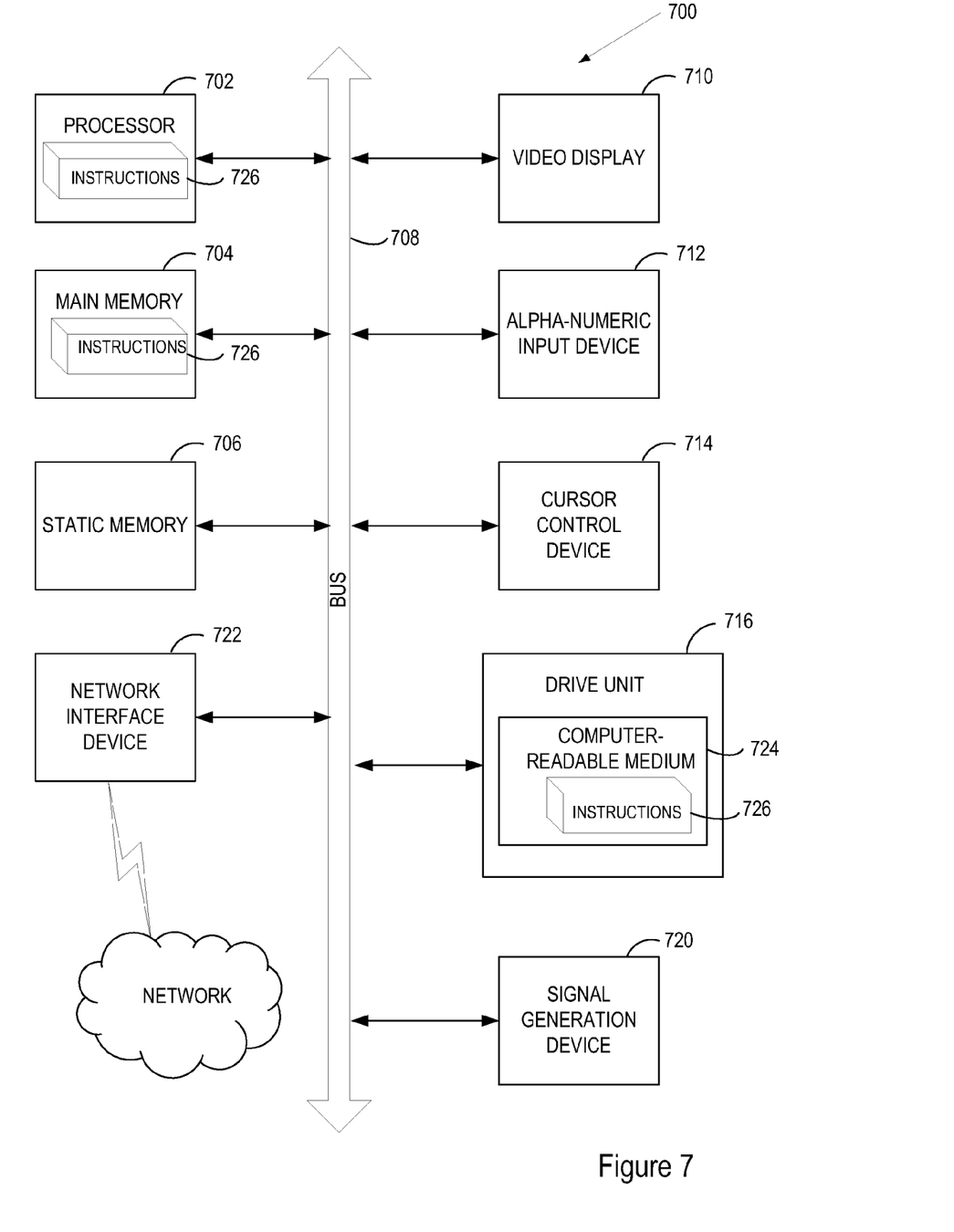
FIG. 7 illustrates a block diagram of one embodiment of a computer system.

FIG. 7 illustrates a diagrammatic representation of a machine in the exemplary form of a computer system 700 within which a set of instructions, for causing the machine to perform any one or more of the methodologies discussed herein, may be executed. In alternative embodiments, the machine may be connected (e.g., networked) to other machines in a LAN, an internet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 700 includes a processing device 702, a main memory 704 (e.g., read-only memory (ROM), flash memory, dynamic random access memory (DRAM) (such as synchronous DRAM (SDRAM) or Rambus DRAM (RDRAM), etc.), a static memory 706 (e.g., flash memory, static random access memory (SRAM), etc.), and a data storage device 718, which communicate with each other via a bus 730.

Processing device 702 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. The processing device 702 is configured to execute the processing logic 726 for performing the operations and steps discussed herein.

The computer system 700 may further include a network interface device 708. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 716 (e.g., a speaker).

The data storage device 718 may include a machine-accessible storage medium 728 on which is stored one or more set of instructions (e.g., software 722) embodying any one or more of the methodologies of functions described herein. The software 722 may also reside, completely or at least partially, within the main memory 704 and/or within the processing device 702 during execution thereof by the computer system 700; the main memory 704 and the processing device 702 also constituting machine-accessible storage media. The software 722 may further be transmitted or received over a network 720 via the network interface device 708.

The machine-readable storage medium 728 may also be used to store instructions to configure display devices in a VM system as described in embodiments of the invention and implemented by system 100 of FIG. 1 or system 200 of FIG. 2, and/or a software library containing methods that call the above applications. While the machine-accessible storage medium 728 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the present invention. The term "machine-accessible storage medium" shall accordingly be taken to include, but not be limited to, solid-state memories, and optical and magnetic media.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as the invention.

What is claimed is:

1. A host computer system comprising:
 a processor;
 a memory coupled to the processor;
 a plurality of virtual machines (VMs) associated with a
  plurality of remote client machines coupled to the host computer system via a network, wherein a VM of the plurality of VMs is executable from the memory to generate data to be transmitted via the network and rendered by a plurality of displays of a corresponding remote client machine;

a plurality of virtual devices enabled on the VM for the plurality of displays of the corresponding remote client machine, each of the plurality of virtual devices being associated with one or more of the plurality of displays that render the data generated by the VM; and a display system, coupled to the VM, to cause a plurality of connections to be established to connect the plurality of virtual devices of the VM with the corresponding remote client machine, each of the plurality of virtual devices having multiple connections to transmit different types of data to the corresponding remote client machine for determining by the corresponding remote client machine which of the plurality of displays is to present a respective type of data.

2. The system of claim 1, wherein:
the display system is a remote display system; and
each of the multiple connections for each of the plurality of virtual devices includes at least one communication channel with the remote client machine.

3. The system of claim 2, wherein a communication channel is provided using one of a dedicated connection or a shared connection.

4. The system of claim 2, wherein the different types of data further comprise at least one of cursor data or three-dimensional data, in addition to the video data and the keyboard data.

5. The system of claim 2, wherein:
a virtual device is connected to the plurality of remote client machines; and
the virtual device is configured to transmit data simultaneously to the plurality of remote client machines.

6. The system of claim 1, wherein:
the plurality of displays are displays of the computer system;
the display system is a display module hosted by the computer system; and
the connection for each of the plurality of virtual devices includes at least one communication channel with the display module hosted by the computer system.

7. The system of claim 1, wherein each display is any one of a dedicated monitor or a window on a screen of the monitor.

8. A client device comprising:
a plurality of displays to render data generated by a remote virtual machine (VM) of a plurality of VMs hosted by a server machine coupled to the client device via a network; and
a processing device, coupled to the plurality of displays, to:
establish a plurality of display connections between the client device and the remote VM for a plurality of virtual devices in the remote VM hosted by the server machine coupled to the client device via the network, wherein multiple display connections of the plurality of display connections are established for each of the plurality of virtual devices to transmit different types of data for each of the plurality of displays;
receive, over the network, the different types of data generated by the remote VM via the multiple display connections from one of the plurality of virtual devices;
determine, by a client display manager running on the client device, a relevant display of the plurality of displays for each of the different types of data; and
forward, by the client display manager, the different types of data to respective display controllers of determined relevant displays.

9. The client device of claim 8, wherein:
the multiple display connections with the one of the plurality of virtual devices includes a dedicated channel for the one of the plurality of virtual devices; and
the relevant display is determined based on context of the display connection.

10. The client device of claim 8, wherein:
the multiple display connections with the one of the plurality of virtual devices comprises is a shared connection for two or more of the plurality of virtual devices; and
the relevant display is determined based on a display ID attached to the data generated by the VM.

11. The client device of claim 8, wherein the different types of data further comprise at least one of cursor data or three-dimensional data, in addition to the video data and the keyboard data.

12. The client device of claim 8, wherein each of the plurality of displays is any one of a dedicated monitor or a window on a screen of the monitor.

13. A method, comprising:
establishing, by a processing device of a client machine, a plurality of display connections between the client machine and a remote virtual machine of a plurality of virtual machines running on a host machine, the remote virtual machine on the host machine coupled to the client machine via a network, the client machine having a plurality of displays to render data generated by the remote virtual machine, the plurality of display connections being established for a plurality of virtual devices enabled on the remote virtual machine for the plurality of displays of the client machine, wherein multiple display connections of the plurality of display connections are established for each of the plurality of virtual devices to transmit different types of data for each of the plurality of displays;
upon receiving, over the network, the different types of data of the remote virtual machine from one of the plurality of virtual devices during an active display connection of the multiple display connections, determining, by the processing device of the client machine, at least one display of the plurality of displays for each of the different types of data; and
providing the different types of data to respective display controllers of determined relevant displays.

14. The method of claim 13, wherein:
the active display connection is a dedicated connection for the one of the plurality of virtual devices; and
the display associated with the received data is determined based on context of the display connection.

15. The method of claim 13, wherein:
the active display connection is a shared connection for two or more of the plurality of virtual devices; and
the display associated with the received data is determined based on a display ID attached to the received data.

16. The method of claim 13, wherein the different types of data further comprise at least one of cursor data or three-dimensional data, in addition to the video data and the keyboard data.

17. The method of claim 13, wherein each of the plurality of displays is any one of a dedicated monitor or a window on a screen of the monitor.

18. A method, comprising:
  establishing, by a host computer, a plurality of display connections between a remote client machine and a virtual machine (VM) of a plurality of VMs running on the host computer coupled to the remote client machine via a network, the remote client machine having a plurality of displays to render data generated by the VM, the plurality of display connections being established for a plurality of virtual devices enabled on the virtual machine for the plurality of displays of the remote client machine, each of the plurality of virtual devices having multiple display connections of the plurality of display connections to transmit different types of data to a corresponding display of the plurality of displays of the remote client machine;
  upon receiving the different types of data during an active display connection of multiple display connections from one of the plurality of virtual devices, determining, by a processing device of the host computer, a relevant display of the plurality of displays to present a respective type of data; and
  providing, over the network, the respective type of data to a display controller of the determined relevant display via a display connection of the multiple display connections that is associated with the one of the plurality of virtual devices.

19. The method of claim 18, wherein:
  the active display connection is a dedicated connection for the one of the plurality of virtual devices; and
  the display associated with the received data is determined based on context of the display connection.

20. The method of claim 18, wherein:
  the active display connection is a shared connection for two or more of the plurality of virtual devices; and
  the display associated with the received data is determined based on a display ID attached to the received data.

21. The method of claim 18, wherein the different types of data further comprise at least one of cursor data or three-dimensional data, in addition to the video data and the keyboard data.

22. The method of claim 18, wherein each of the plurality of displays is any one of a dedicated monitor or a window on a screen of the monitor.

23. A non-transitory computer-readable storage medium including data that, when accessed by a processing device of a host computer, cause the processing device to:
  establish a plurality of display connections between a remote client machine and a virtual machine (VM) of a plurality of VMs running on the host computer coupled to the remote client machine via a network, the remote client machine having a plurality of displays to render data generated by the VM, the plurality of display connections being established for a plurality of virtual devices enabled on the virtual machine for the plurality of displays of the remote client machine, each of the plurality of virtual devices having multiple connections to transmit different types of data to a corresponding display of the plurality of displays of the remote client machine;
  upon receiving the different types of data during an active display connection of multiple display connections from one of the plurality of virtual devices, determining, by a processing device of the host computer, a relevant display of the plurality of displays to present a respective type of data; and
  providing, over the network, the respective type of data to a display controller of the determined relevant display via a display connection of the multiple display connections that is associated with the one of the plurality of virtual devices.

24. The computer-readable storage medium of claim 23, wherein the plurality of displays are directly connected to the remote client machine.

* * * * *